United States Patent
Chang

(10) Patent No.: US 8,375,715 B2
(45) Date of Patent: Feb. 19, 2013

(54) ENERGY CONVERTER FOR CONVERTING SOLAR ENERGY INTO ELECTRIC POWER

(75) Inventor: Jen-Tsorng Chang, Tu-Cheng (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 736 days.

(21) Appl. No.: 12/629,126

(22) Filed: Dec. 2, 2009

(65) Prior Publication Data

US 2010/0162701 A1 Jul. 1, 2010

(30) Foreign Application Priority Data

Dec. 31, 2008 (CN) .......................... 2008 1 0306758

(51) Int. Cl.
*F03G 6/00* (2006.01)
*H02P 9/04* (2006.01)

(52) U.S. Cl. .............. 60/641.14; 60/641.12; 60/641.15; 60/641.8; 290/1 R

(58) Field of Classification Search .......... 60/641.8, 60/641.11, 641.12, 641.14, 641.15; 290/1 R
See application file for complete search history.

(56) References Cited

U.S. PATENT DOCUMENTS

| | | | | | |
|---|---|---|---|---|---|
| 4,033,134 | A | * | 7/1977 | Bentley ........................ | 60/641.8 |
| 4,173,123 | A | * | 11/1979 | Gurtler ........................ | 60/641.13 |
| 4,399,368 | A | * | 8/1983 | Bucknam ..................... | 290/1 R |
| 4,452,047 | A | * | 6/1984 | Hunt et al. ................... | 60/641.15 |
| 2010/0043434 | A1 | * | 2/2010 | Ortiz et al. .................. | 60/641.15 |

* cited by examiner

*Primary Examiner* — Hoang Nguyen
(74) *Attorney, Agent, or Firm* — Altis Law Group, Inc.

(57) ABSTRACT

An energy converter, includes a base, a first and a second converging lenses, an electric coil and a movable module. The base includes a substrate, a transparent chamber and two supporters formed on the substrate. The transparent chamber includes a first and a second vents formed therein. The first and second converging lenses are supported by the respective supporters. The electric coil is fixed on the substrate, and the electric coil defines a receiving space therein. The movable module includes a piston, a connector connected to the piston, a magnet connected to the connector, and a shading plate disposed on the connector and having an opening defined therein. The piston is moved in the transparent chamber due to thermal expansion of air in the transparent chamber, thereby moving the magnet in or out of the receiving space of the electric coil, and thus the electric power is generated.

14 Claims, 5 Drawing Sheets

ENERGY CONVERTER FOR CONVERTING SOLAR ENERGY INTO ELECTRIC POWER

BACKGROUND

1. Technical Field

The present disclosure relates to energy converters, and particularly, to an energy converter for converting solar energy into electric power.

2. Description of Related Art

Energy converters have been widely used, e.g., for converting solar energy into electric power.

A typical energy converter for converting solar energy into electric power uses a solar cell panel which includes a P-type semiconductor layer, an N-type semiconductor layer and a few junction layers. However, the semiconductor materials are expensive, and to make such semiconductor layer is complicated.

What is needed, therefore, is an energy converter which can overcome the above shortcomings

BRIEF DESCRIPTION OF THE DRAWINGS

Many aspects of the energy converter can be better understood with reference to the following drawings. The components in the drawings are not necessarily drawn to scale, the emphasis instead being placed upon clearly illustrating the principles of the present energy converter. Moreover, in the drawings, like reference numerals designate corresponding parts throughout the several views.

DETAILED DESCRIPTION OF THE EMBODIMENTS

Embodiments of the present energy converter will now be described in detail below and with reference to the drawings.

Figure 1:
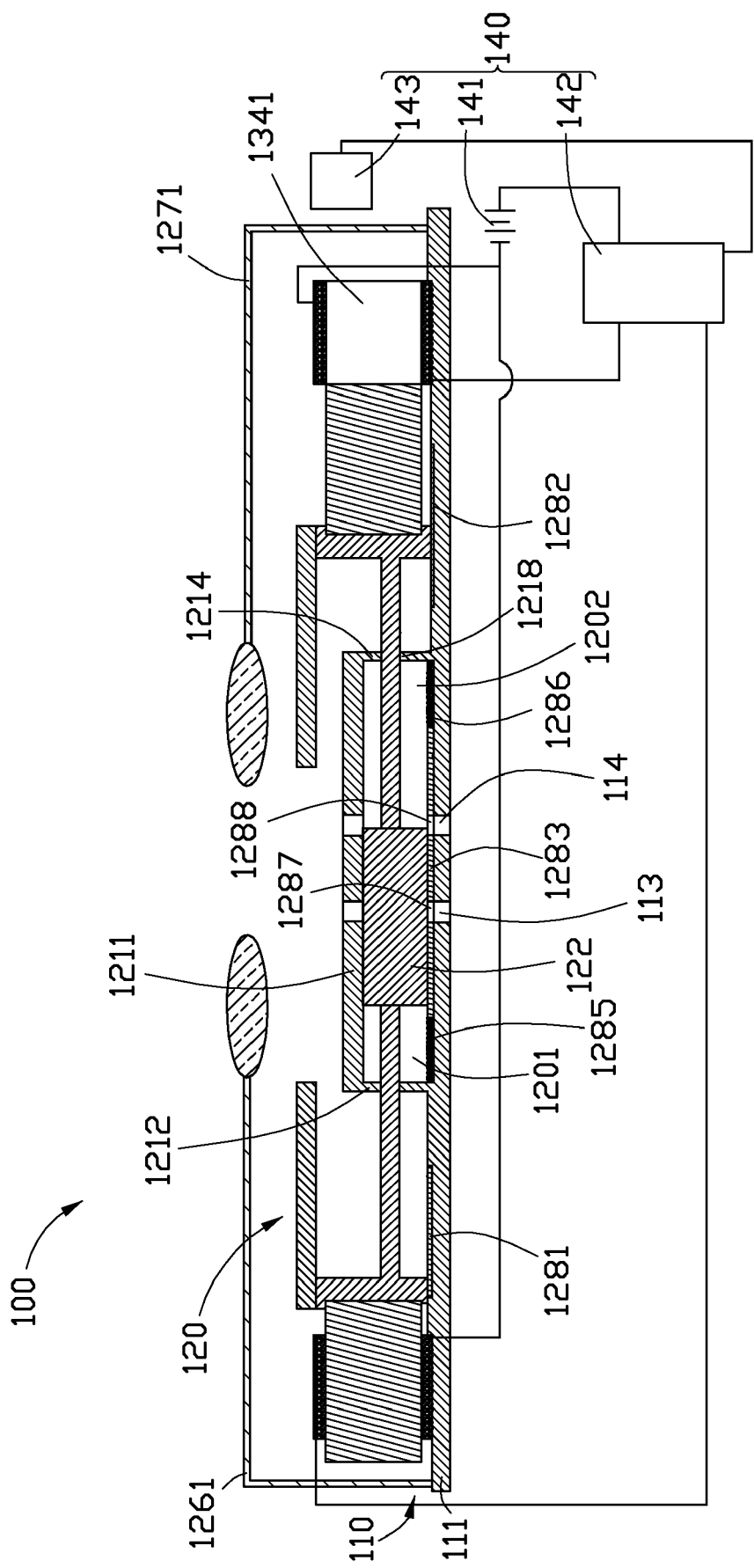
FIG. 1 is a schematic, sectional view of an energy converter in accordance with a first embodiment, wherein the energy converter includes a movable module, and the movable module is located at a first position.
Figure 2:
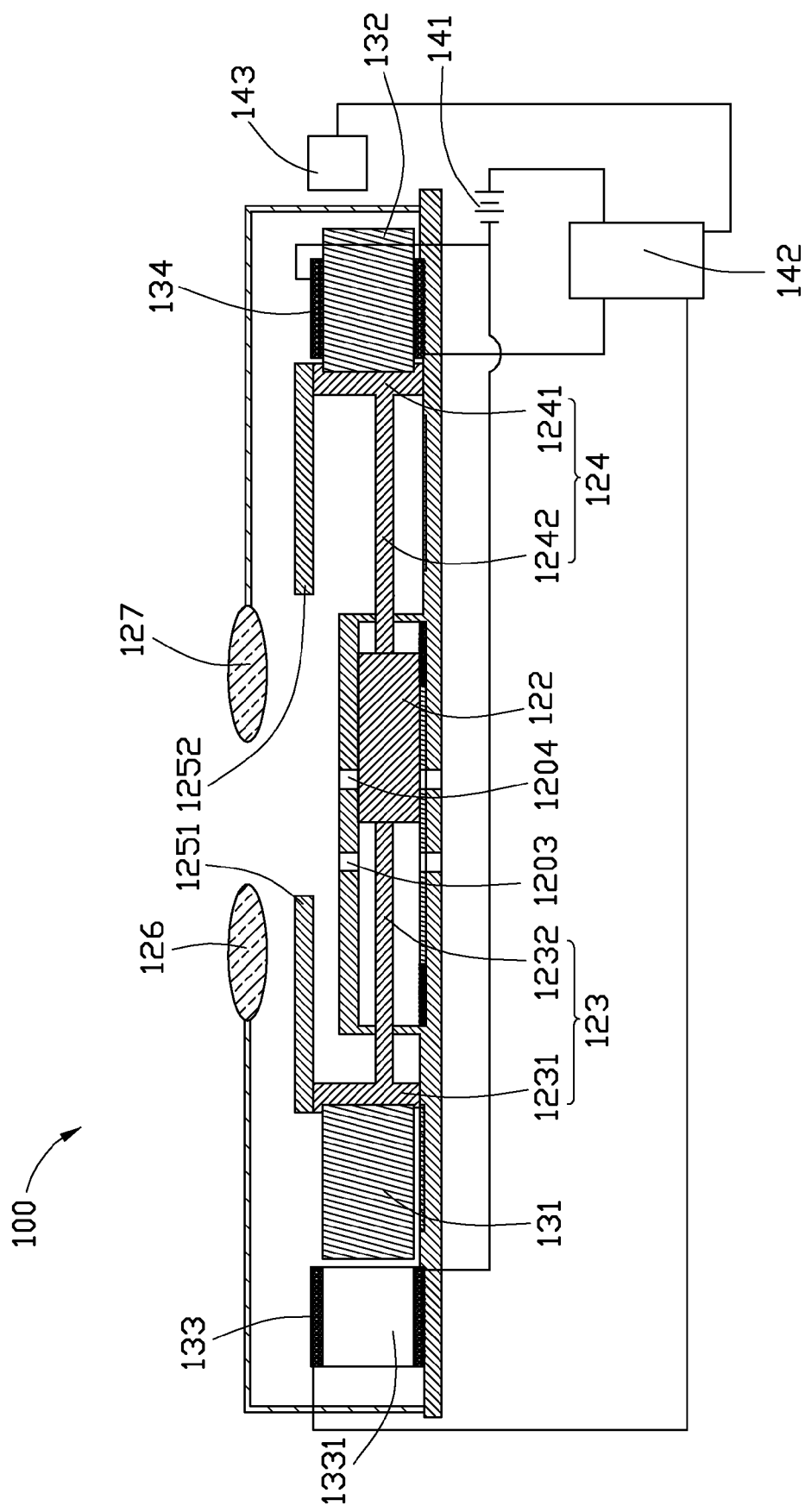
FIG. 2 shows the movable module of the energy converter of FIG. 1 is located at a second position.
Figure 3:
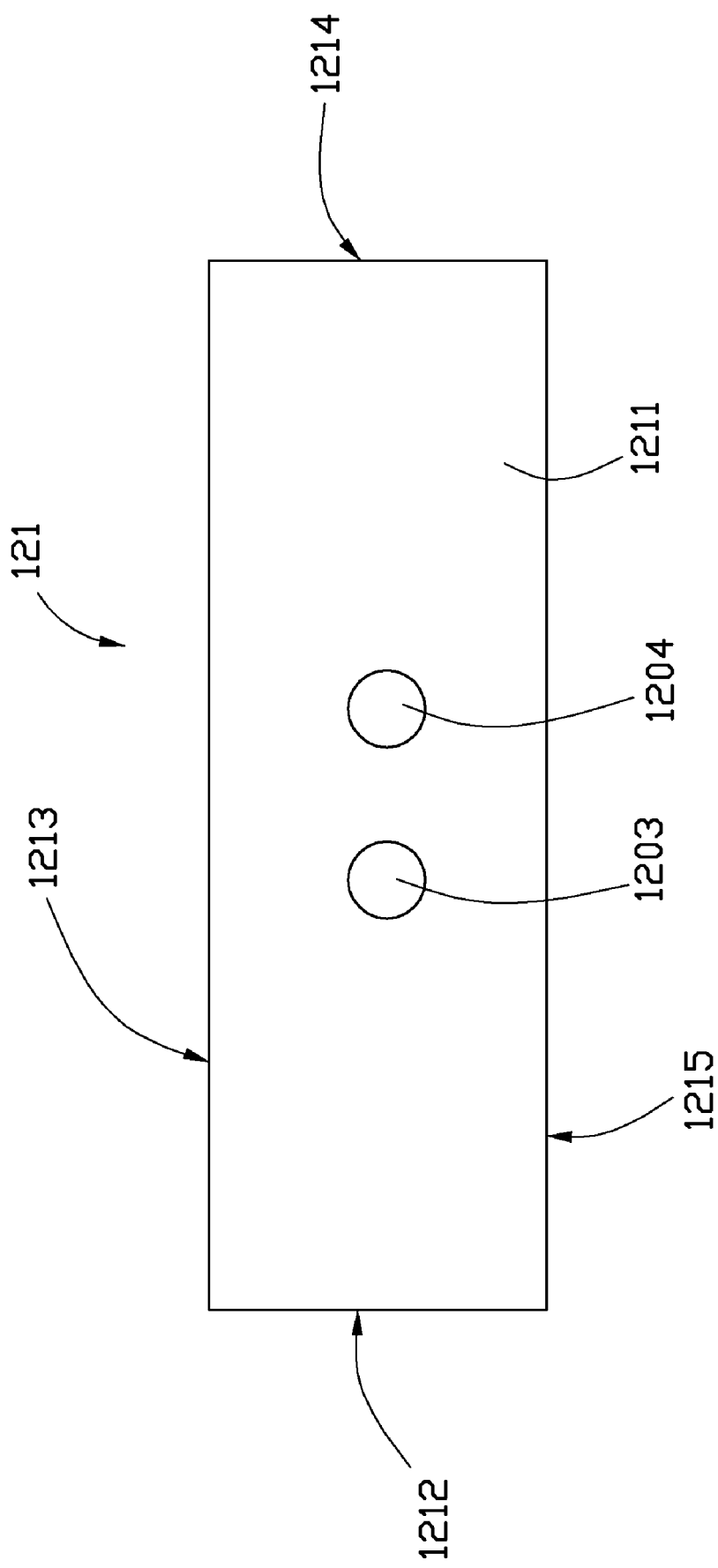
FIG. 3 is a top plan view showing a transparent chamber of the energy converter of FIG. 1.

Referring to FIGS. 1 to 3, an energy converter 100 in accordance with a first embodiment, is provided. The energy converter 100 includes a base 110, a first converging lens 126, a second converging lens 127, a first electric coil 133, a second electric coil 134, and a movable module 120.

The base 110 includes a substrate 111, a transparent chamber 121, and two supporters 1261, 1271. The substrate 111 defines a first vent 113 and a second vent 114. The transparent chamber 121 is made of transparent materials and is formed on the substrate 111. In the present embodiment, the transparent chamber 121 is integrally formed with the substrate 111, and is rectangular. Also referring to FIG. 3, the transparent chamber 121 includes a top plate 1211, and four side plates 1212, 1213, 1214, 1215. The top plate 1211 defines a third vent 1203 and a fourth vent 1204. The side plates 1212, 1214 each have an engaging hole 1218 formed therein. The first vent 113, the second vent 114, the third vent 1203, the fourth vent 1204, and the engaging holes 1218 are in communication with the inner space of the transparent chamber 121. The first vent 113 is aligned with the third vent 1203. The second vent 114 is aligned with the fourth vent 1204.

The two supporters 1261, 1271 are formed on the substrate 111, and each includes a vertical beam connected to the substrate 111, and a horizontal beam connected to the vertical beam. The ends of the horizontal beams face to each other, and cooperatively defines a space therebetween. The first converging lens 126 and the second converging lens 127 are disposed above the transparent chamber 121 in the space, and are supported by the ends of the horizontal beams.

The first electric coil 133 and the second electric coil 134 are fixed on two ends of the substrate 111, respectively. The first electric coil 133 defines a receiving space 1331 therein. The second electric coil 134 defines a receiving space 1341 therein.

The movable module 120 includes a piston 122, a first connector 123, a second connector 124, a first magnet 131, a second magnet 132, a first shading plate 1251, and a second shading plate 1252. The piston 122 is made of thermal insulation material, and is also rectangular. A length of the piston 122 is shorter than a length of the inner space of the transparent chamber 121, and a height of the piston 122 is substantially equal to but a little shorter than a height of the inner space of the transparent chamber 121. With this configuration, the piston 122 is movably received in the inner space of the transparent chamber 121, and the piston 122 is able to substantially obstruct the first vent 113, the second vent 114, the third vent 1203, and the fourth vent 1204. The piston 122 partitions the inner space of the transparent chamber 121 into a first part 1201 and a second part 1202.

The first connector 123 includes a vertical beam 1231 abutting the substrate 111, and a horizontal beam 1232 extending from a middle portion of the vertical beam 1231. The second connector 124 includes a vertical beam 1241 abutting the substrate 111, and a horizontal beam 1242 extending from a middle portion of the vertical beam 1241. A height of each of the vertical beams 1231, 1241 is shorter than a height of each of the vertical beams of the supporters 1261, 1271, and is greater than a height of the transparent chamber 121. The horizontal beams 1232, 1242 extend through the engaging holes 1218, respectively, and the ends thereof are connected to the piston 122. The horizontal beams 1232, 1242 are arranged in a line.

The first magnet 131 and the second magnet 132 are permanent magnets, and are connected to the ends of the vertical beams 1231, 1241, respectively. The first and second magnets 131, 132 each have a North pole and an opposite South pole. The North poles are adjacent to the vertical beams 1231, 1241, and the South poles are adjacent to the first and second electric cols 133, 134. In an alternative embodiment, the North poles can be adjacent to the first and second electric cols 133, 134, and the South poles can be adjacent to the vertical beams 1231, 1241. The heights and widths of the first and second magnets 131, 132 are shorter than those of the receiving spaces 1331, 1341 of the first and second electric coils 133, 134. A space is maintained between the bottom of the first magnet 131 and the substrate 111, and a space is maintained between the bottom of the second magnet 132 and the substrate 111, with the space being equal to or greater than diameters of the first and second electric coils 133, 134. Such that, the first and second magnets 131, 132 are movable in and out of the receiving spaces 1331, 1341 of the first and second electric coils 133, 134.

The first shading plate 1251 and the second shading plate 1252 are disposed on the vertical beams 1231, 1241, and the ends of the first and second plates 1251, 1252 face each other. The ends of the first and second shading plate 1251, 1252 cooperatively define a space therebetween.

A first lubricating coating 1281 and a second lubricating coating 1282 are applied on parts of the substrate 111 that engages with the vertical beams 1231, 1241 of the first and second connectors 123, 124. A third lubricating coating 1283 is applied on the substrate 111 in the transparent chamber 121 where the piston 122 is moved. The first, second and third lubricating coating 1281, 1282, 1283 can be made of an alloy of Ni and Al. Two through holes 1287, 1288 are formed in the third lubricating coating 1283 and are aligned with the first and second vents 113, 114, respectively. Two heat absorption coatings 1285, 1286 which are made of macromolecule, are applied in the first part 1201 and the second part 1202 of the inner space of the transparent chamber 121.

In operation, at a first time, the piston 122 is located at a first position where the piston 122 obstructs the first vent 113 and the third vent 1203 to allow the first part 1201 of the inner space of the transparent chamber 121 to be closed (see FIG. 1). The first converging lens 126 converges incident solar light to the first part 1201 of the inner space of the transparent chamber 121 through the space between the first and second shading plates 1251, 1252. The second part 1202 of the inner space of the transparent chamber 121 is in communication with outside through the through hole 1288, the second vent 114, and the fourth vent 1204. Furthermore, the second shading plate 1252 shades at least part of the second part 1202 of the transparent chamber 121. The first magnet 131 is inserted in the receiving space 1331 of the first electric coil 133, and the second magnet 132 is pulled out of the receiving space 1341 of the second electric coil 134.

At this first time, air in the first part 1201 of the inner space of the transparent chamber 121 are heated by solar light, and the thermal expansion of the air would cause the piston 122 to move towards the second part 1202 of the inner space of the transparent chamber 121, thereby moving the entire movable module 120. The piston 122 becomes limited at a second position where the piston 122 obstructs the second vent 114 and the fourth vent 1204 (see FIG. 2). Then, at a second time, the second part 1202 of the inner space of the transparent chamber 121 is closed and is exposed to the second converging lens 127 through the space between the first and second shading plates 1251, 1252, and the first part 1201 of the inner space of the transparent chamber 121 is in communication with outside through the through hole 1287, the first vent 113 and the third vent 1203. The first magnet 131 is pulled out of the receiving space 1331 of the first electric coil 133, and the second magnet 132 is inserted in the receiving space 1341 of the second electric coil 134.

Due to the movement of the first and second magnets 131, 132 in and out of the first and second electric coils 133, 134, the first and second electric coils 133, 134 are electrified, and the electric power is generated.

A chargeable battery 141 can be electrically connected to the first and second electric coils 133, 134 by a switch 142, and a monitor 143 is configured to detect movement of at least one of the first and second magnets 131, 132. The monitor 143 is electrically connected to the switch 142, and when the movement of the at least one of first and second magnets 131, 132 is detected, the switch 142 is turned on, and the storage battery 141 is charged.

Figure 4:
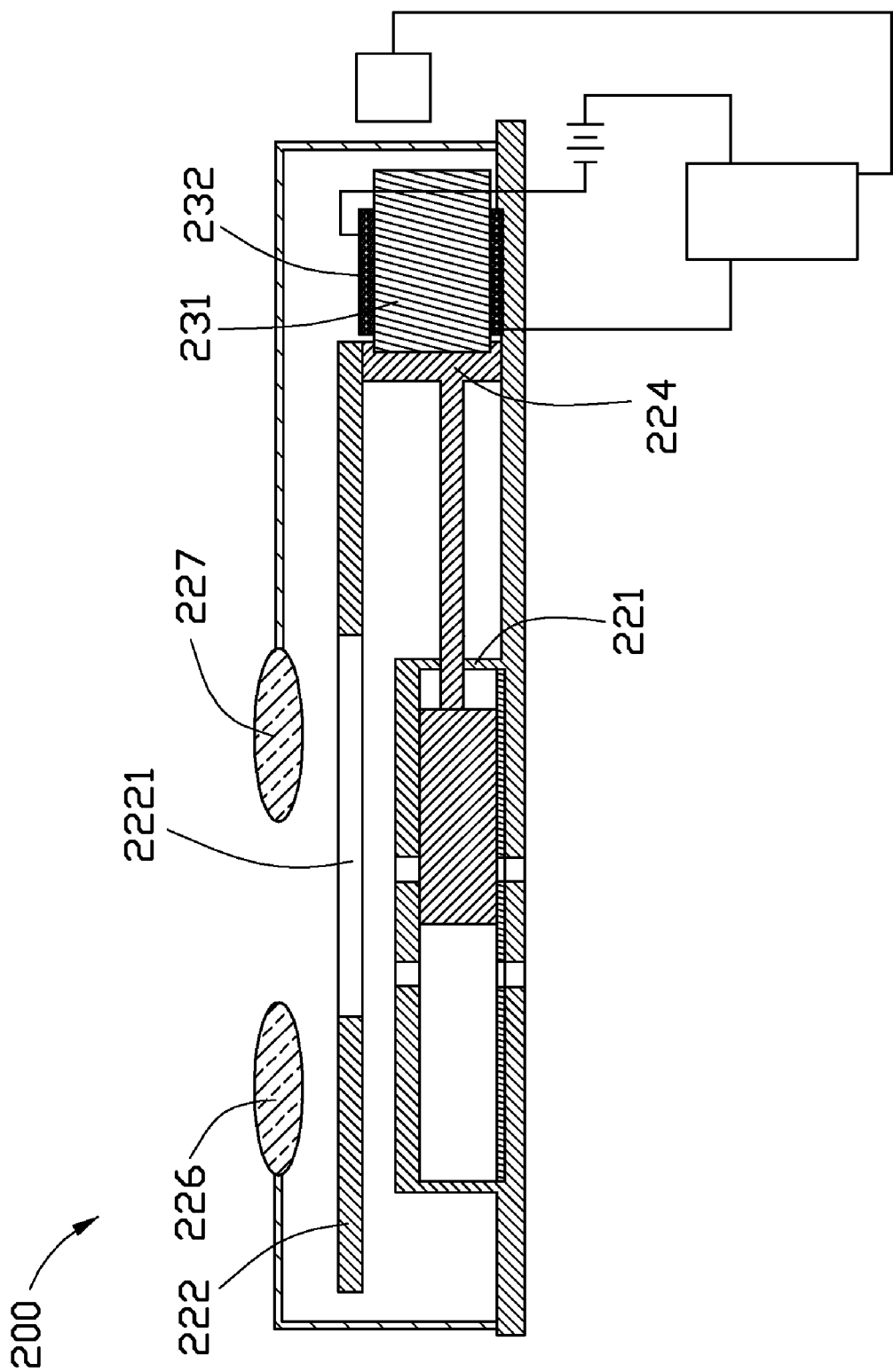
FIG. 4 is a schematic, sectional view of an energy converter in accordance with a second embodiment, wherein the energy converter includes a movable module, and the movable module is located at a first position.
Figure 5:
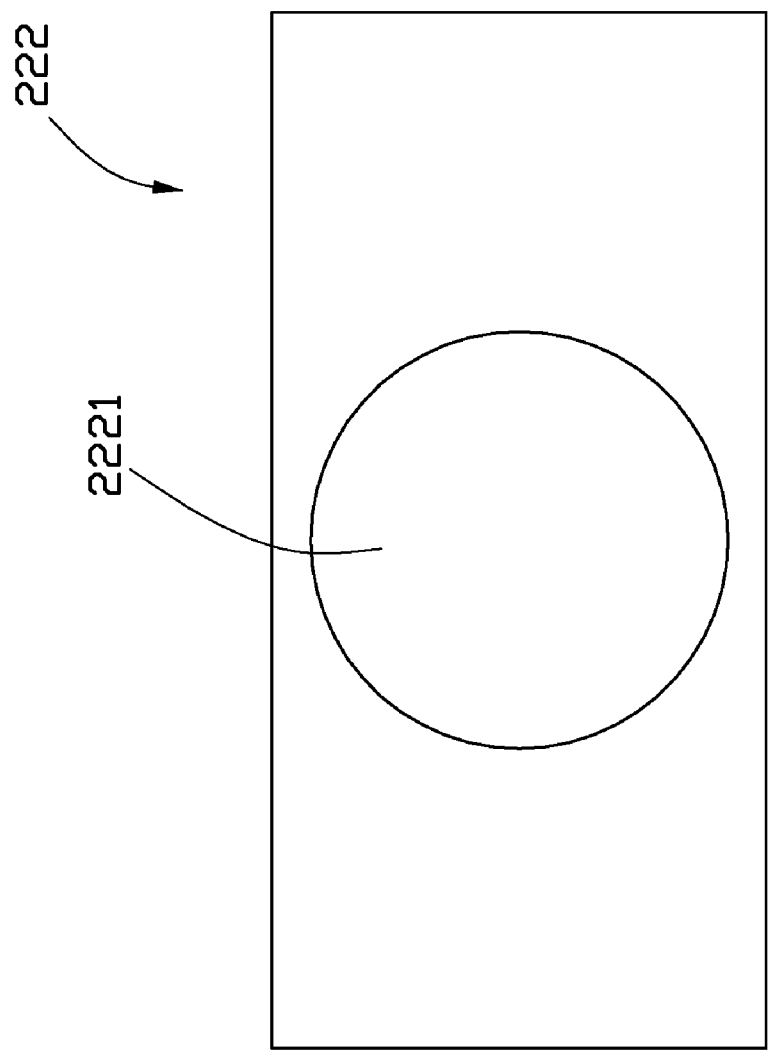
FIG. 5 is a top plan view showing a shading plate of the energy converter of FIG. 4.

Referring to FIGS. 4 and 5, an energy converter 200 in accordance with a second embodiment, is provided. The energy converter 200 is similar to the energy converter 100 described above, the difference is that the energy converter 200 includes only one connector 224, only one magnet 231, only one electric coil 232, and only one shading plate 222. The shading plate 222 has an opening 2221 defined therein, and the opening 2221 is configured to allow part of the transparent chamber 221 to be exposed to one of the first and second converging lenses 226, 227.

It is understood that the above-described embodiments are intended to illustrate rather than limit the disclosure. Variations may be made to the embodiments and methods without departing from the spirit of the disclosure. Accordingly, it is appropriate that the appended claims be construed broadly and in a manner consistent with the scope of the disclosure.

What is claimed is:

1. An energy converter, comprising:
   a base comprising a substrate, a transparent chamber formed on the substrate, and two supporters formed on the substrate, each of the supporters comprising a beam suspended above the substrate, the transparent chamber comprising an inner space, a first vent and a second vent in communication with the inner space, the substrate comprising a third vent and a fourth vent defined therein and in communication with the inner space;
   a first converging lens and a second converging lens supported by the respective beams of the supporters;
   a first electric coil and a second electric coil fixed on the substrate, each of the first electric coil and the second electric coil defining a receiving space therein; and
   a movable module comprising a piston movably received in the transparent chamber, a first connector comprising a first end connected to the piston and a second end, a second connector comprising a third end connected to the piston and a fourth end, a first magnet connected to the second end of the first connector, a second magnet connected to the fourth end of the second connector, a first shading plate disposed on the first connector, and a second shading plate disposed on the second connector, a space being maintained between the first shading plate and the second shading plate, the piston partitioning the inner space of the transparent chamber into a first part and a second part;
   wherein the movable module is movable between a first position where the piston obstructs the first vent and the third vent to allow the first part of the inner space to be closed, the first converging lens converges sunlight incident thereon to the first part of the inner space through the space between the first shading plate and the second shading plate, the second part of the inner space is in communication with outside through the second vent and the fourth vent, the second shading plate shades at least part of the second part of the transparent chamber, the first magnet is inserted in the receiving space of the first electric coil and the second magnet is pulled out of the receiving space of the second electric coil, and a second position where the piston obstructs the second vent and the fourth vent to allow the second part of the inner space to be closed, the second converging lens converges sunlight incident thereon to the second part of the inner space through the space between the first shading plate and the second shading plate, the first part of the inner space is in communication with outside through the first vent and the third vent, the first shading plate shades at least part of the first part of the transparent chamber, the second magnet is inserted in the receiving space of the second electric coil and the first magnet is pulled out of the receiving space of the first electric coil, wherein the piston is driven to be moveable by thermal expansion of air in the first part or the second part of the inner space caused by the converged sunlight, thereby moving the first magnet and the second magnet into or out of the respective receiving spaces of the first and second electric coils, thus generating an electric power in the first and second electric coils.

2. The energy converter as described in claim 1, wherein each of the first connector and the second connector comprises a vertical beam abutting the substrate and a horizontal beam extending from a middle portion of the vertical beam, the first and second shading plates are disposed on the vertical beams, the first and second magnets are connected to the vertical beams, the piston is connected to the horizontal beams, the horizontal beams are aligned with each other.

3. The energy converter as described in claim 2, wherein a first and a second lubricating coatings are applied on two parts of the substrate where the vertical beams are moved, a third lubricating coating is applied on the substrate within the transparent chamber where the piston is moved, and two through holes are formed in the third lubricating coating and aligned with the third vent and fourth vent, respectively.

4. The energy converter as described in claim 1, wherein two heat absorption coatings are applied in the first part and the second part of the inner space of the transparent chamber.

5. The energy converter as described in claim 1, wherein the piston is made of a thermal insulation material.

6. The energy converter as described in claim 1, further comprising a storage battery electrically connected to the first and second electric coils.

7. The energy converter as described in claim 6, further comprising a switch electrically connected to the first and second electric coils and the storage battery, and a monitor electrically connected to the switch and configured for detecting movement of at least one of the first and second magnets.

8. An energy converter, comprising:
a base comprising a substrate, a transparent chamber formed on the substrate, and two supporters formed on the substrate, each of the supporters comprising a beam suspended above the substrate, the transparent chamber comprising an inner space, a first vent and a second vent in communication with the inner space, the substrate comprising a third vent and a fourth vent in communication with the inner space;
a first converging lens and a second converging lens supported by the respective beams of the supporters;
an electric coil fixed on the substrate, the electric coil defining a receiving space therein; and
a movable module comprising a piston movably received in the transparent chamber, a connector comprising a first end connected to the piston and a second end, a magnet connected to the second end of the connector, and a shading plate disposed on the connector and having an opening defined therein, the piston partitioning the inner space of the transparent chamber into a first part and a second part;
wherein the movable module is movable between a first position where the piston obstructs the first vent and the third vent to allow the first part of the inner space to be closed, the first converging lens converges sunlight incident thereon to the first part of the inner space through the opening of the shading plate, the second part of the inner space is in communication with outside through the second vent and the fourth vent, the shading plate shades at least part of the second part of the transparent chamber, and the magnet is inserted in the receiving space of the electric coil, and a second position where the piston obstructs the second vent and the fourth vent to allow the second part of the inner space to be closed, the second converging lens converges sunlight incident thereon to the second part of the inner space through the opening of the shading plate, the first part of the inner space is in communication with outside through the first vent and the third vent, the shading plate shades at least part of the first part of the transparent chamber, and the magnet is pulled out of the receiving space of the electric coil, wherein the piston is driven to be movable by thermal expansion of air in the first part or the second part of the inner space, thereby moving the magnet into or out of the receiving space of the electric coil, thus generating an electric power.

9. The energy converter as described in claim 8, wherein the connector comprises a vertical beam abutting the substrate and a horizontal beam extending from a middle portion of the vertical beam, the shading plate is disposed on the vertical beam, the magnet is connected to the vertical beam, and the piston is connected to the horizontal beam.

10. The energy converter as described in claim 9, wherein a first lubricating coating is applied on a part of the substrate where the vertical beam is moved, a second lubricating coating is applied on the substrate within the transparent chamber where the piston is moved, and two through holes are formed in the second lubricating coating and aligned with the third vent and fourth vent, respectively.

11. The energy converter as described in claim 8, wherein two heat absorption coatings are applied in the first part and the second part of the inner space of the transparent chamber.

12. The energy converter as described in claim 8, wherein the piston is made of a thermal insulation material.

13. The energy converter as described in claim 8, further comprising a storage battery electrically connected to the electric coil.

14. The energy converter as described in claim 13, further comprising a switch electrically connected to the electric coil and the storage battery, and a monitor electrically connected to the switch and configured for detecting movement of the magnet.

\* \* \* \* \*